United States Patent [19]

Ohgami et al.

[11] 4,402,288

[45] Sep. 6, 1983

[54] SYSTEM FOR REGULATING THE ENGINE SPEED

[75] Inventors: Masaaki Ohgami, Musashino; Makoto Shikata, Musashimurayama; Kazuo Hara, Musashino, all of Japan

[73] Assignees: Fuji Jukogyo Kabushiki Kaisha, Tokyo; Nissan Motor Co., Ltd., Yokohama, both of Japan

[21] Appl. No.: 223,676

[22] Filed: Jan. 9, 1981

[30] Foreign Application Priority Data

Mar. 7, 1980 [JP] Japan .................................. 55-29332

[51] Int. Cl.³ .......................... F02D 1/04; F02D 9/00; F02M 23/04; F02M 51/06
[52] U.S. Cl. .................................... 123/339; 123/330; 123/340; 290/51
[58] Field of Search ............... 123/339, 340, 330, 331; 290/50, 51 X, 40 B, 40 R

[56] References Cited

U.S. PATENT DOCUMENTS

| 3,192,394 | 6/1965 | Teter | 290/51 |
| 3,991,357 | 11/1976 | Kaminski | 290/50 |
| 4,297,978 | 11/1981 | Matsui | 123/339 |
| 4,306,527 | 12/1981 | Kinngawa et al. | 123/339 |

Primary Examiner—Raymond A. Nelli
Attorney, Agent, or Firm—Martin A. Farber

[57] ABSTRACT

A system for regulating the engine speed so as to maintain the voltage between terminals of a battery at a constant value. A constant-voltage circuit is connected at a terminal of the battery for supplying a constant voltage. A comparator is provided for comparing the voltage between the terminals of the battery with the constant voltage and for producing an output signal in dependency on the difference between the input voltages thereto. The output signal is fed to an actuator through a driving circuit. The actuator operates in response to the driving signal from the driving circuit for opening or closing the throttle valve for regulating the engine speed, so that the voltage between the terminals of the battery may be maintained at a constant level.

13 Claims, 5 Drawing Figures

SYSTEM FOR REGULATING THE ENGINE SPEED

BACKGROUND OF THE INVENTION

The present invention relates to a system for regulating the speed of an internal combustion engine for maintaining the voltage between terminals of a battery at a predetermined level.

A conventional engine is provided with a governor for maintaining the engine speed at a constant speed in an idling operation in order to supply a constant voltage from the generator to the battery. Such a governor has a counter for counting the engine speed and a complicated controller for controlling the engine speed in dependency on the count. As a result, the governor is expensive and complicated in construction. Further, the governor for maintaining the engine speed at the constant speed cannot sufficiently compensate the increase of electrical load caused by electrical devices such as head lamps and air fuel ratio control system.

SUMMARY OF THE INVENTION

The object of the present invention is to provide a system which controls the engine speed so as to maintain the voltage between terminals of the battery to a predetermined level during the idling.

According to the present invention, there is provided a system for regulating the engine speed having a battery, a generator for charging said battery and a throttle valve provided in a carburetor, comprising an electro-mechanical actuator for actuating said throttle valve, a constant-voltage circuit connected to a terminal of said battery for supplying a constant voltage, a comparator for comparing the voltage between terminals of said battery with said constant voltage and for producing an output signal in dependency on the difference between the input voltages thereto, and a driving circuit for generating a driving signal to said electro-mechanical actuator in dependency on said output signal of said comparator, and said electro-mechanical actuator responsive to said driving signal from said driving circuit for opening or closing said throttle valve for regulating the engine speed so as to maintain the voltage between the terminals of said battery at a constant value.

Other objects and features of the present invention will become apparent from the following description of a preferred embodiment with reference to the accompanying drawings.

DETAILED DESCRIPTION OF THE PREFERRED EMBODIMENTS

Figure 1:
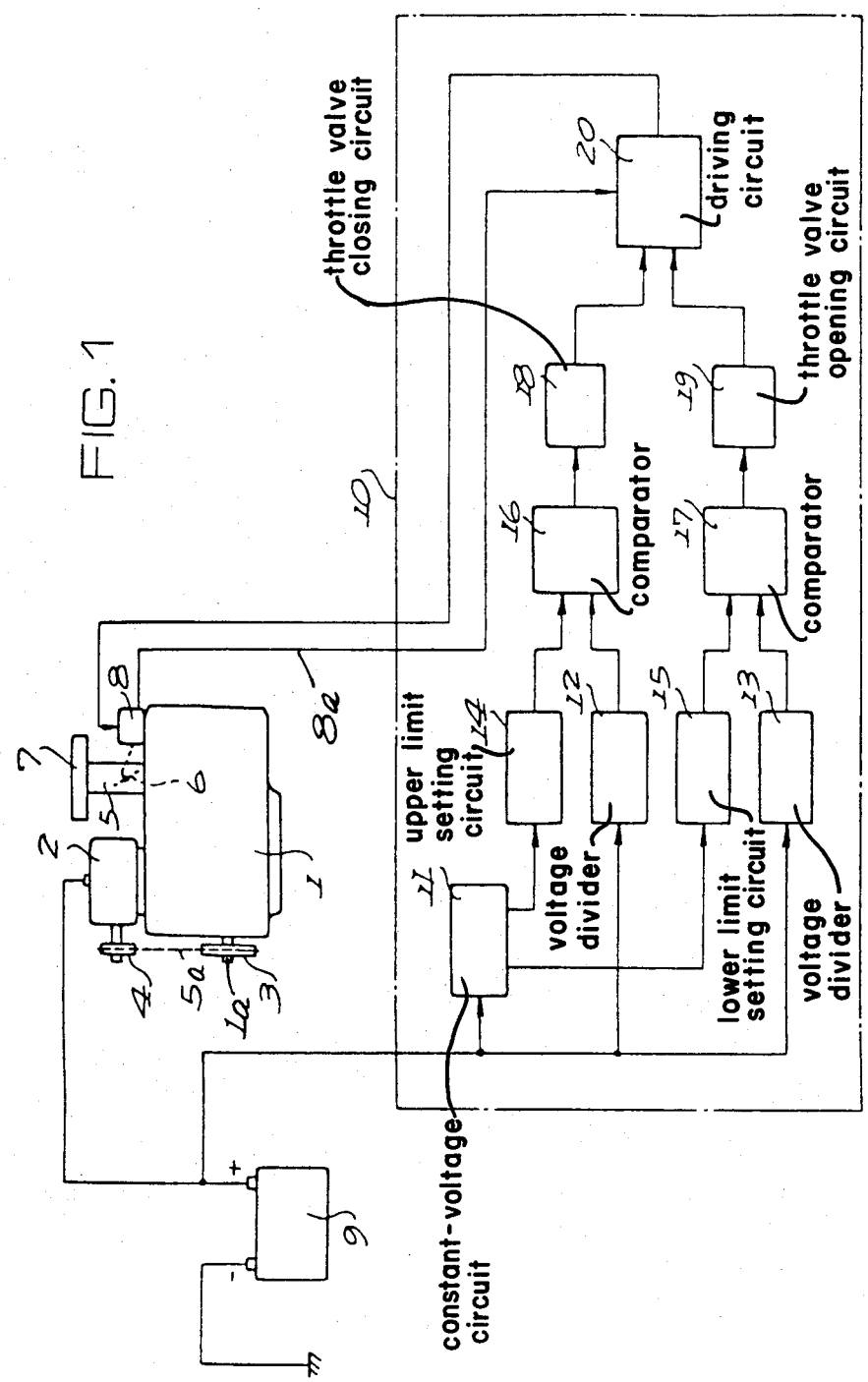
FIG. 1 is a block diagram showing a system of the present invention.

Referring to FIG. 1, an internal combustion engine 1 is provided with a generator 2 which is connected to the crank shaft 1a of the engine by pulleys 3 and 4 and a belt 5a. A carburetor 5 has a throttle valve 6 and an air cleaner 7. The shaft of the throttle valve 6 is connected to an actuator 8. The output terminal of the generator 2 is connected to the positive terminal of a battery 9.

The positive terminal of the battery 9 is connected to a regulating circuit 10 for regulating the engine speed so as to maintain the voltage between the terminals of said battery at a constant value comprising among other elements a constant-voltage circuit 11 and voltage dividers 12 and 13 all connected to positive terminal of the battery 9. The constant-voltage circuit 11 is connected to an upper limit setting circuit 14 and a lower limit setting circuit 15. The voltage divider 12 and the upper limit setting circuit 14 are connected to a comparator 16, and the voltage divider 13 and the lower limit setting circuit 15 are connected to a comparator 17. The output of the comparator 16 is connected to a throttle valve closing circuit 18 and the output of the comparator 17 is connected to a throttle valve opening circuit 19. Further, the outputs of both circuits 18 and 19 are connected to a driving circuit 20. The output of the driving circuit 20 is connected to the actuator 8 and, on the other hand, the driving circuit 20 receives limit signals from the actuator 8 through a line 8a. The regulating circuit 10 further includes circuits 14, 15, 18–20 and comparators 16–17.

Figure 2:
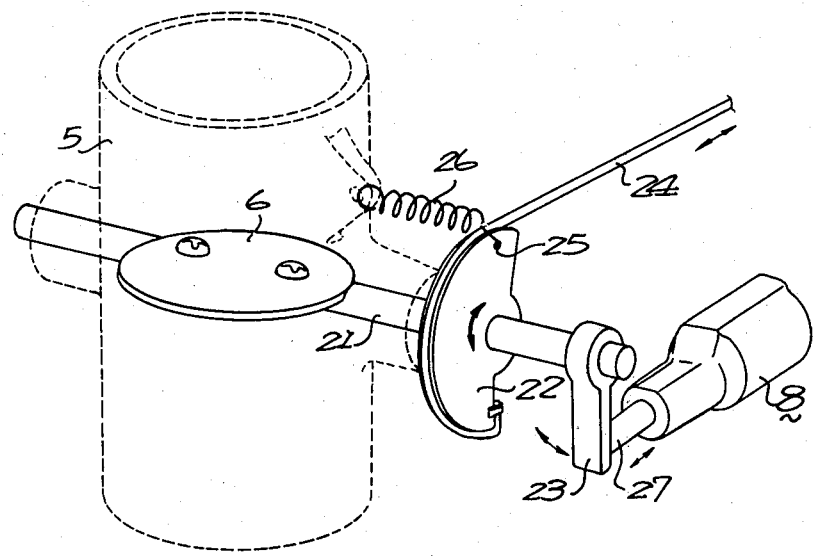
FIG. 2 is a perspective view showing an actuator and a carburetor.

Referring to FIG. 2, a throttle levers 22 and 23 are secured to the shaft 21 of the throttle valve 6. The throttle lever 22 is connected to an accelerator pedal through an accelerator cable 24 and biased by a spring 26 so as to be closed. The lever 23 abuts on the end of a rod 27 of the actuator 8.

Figure 3:
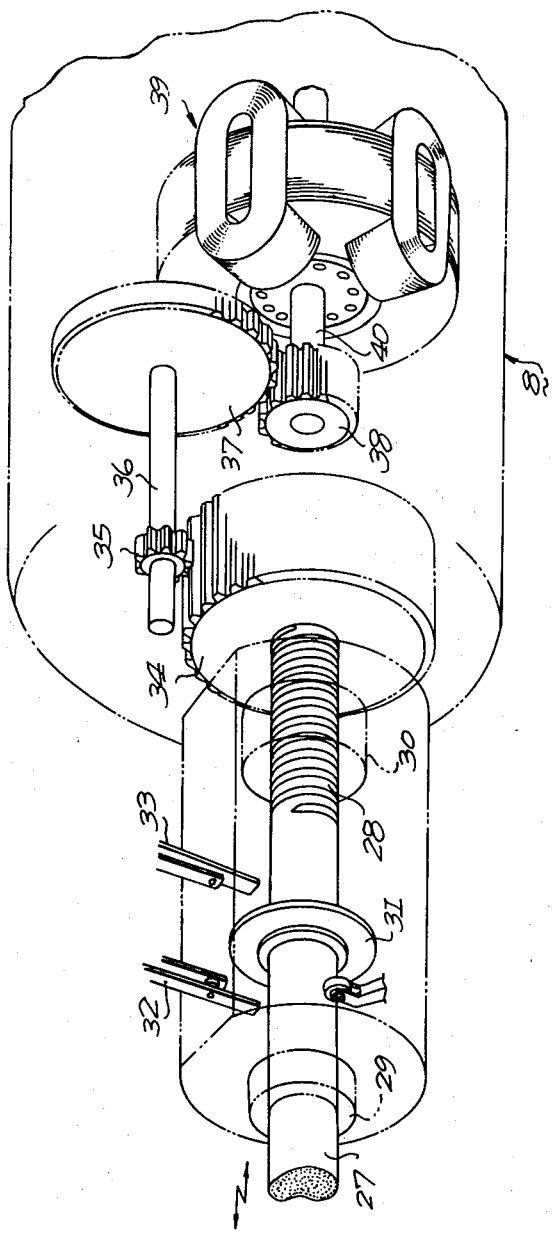
FIG. 3 is a perspective view showing the actuator in detail.

As shown in FIG. 3, the rod 27 is secured to a gear 34 and supported by a bearing 29. The rod 27 has an actuating plate 31 and a screw portion 28 which is threaded into a stationary fixed nut 30. A pair of limit switches 32 and 33 are provided on opposite sides of the plate 31. The gear 34 engages with a small gear 35 secured to a shaft 36 of a large gear 37. The gear 37 engages with a small gear 38 secured to a shaft 40 of a motor 39.

Figure 4:
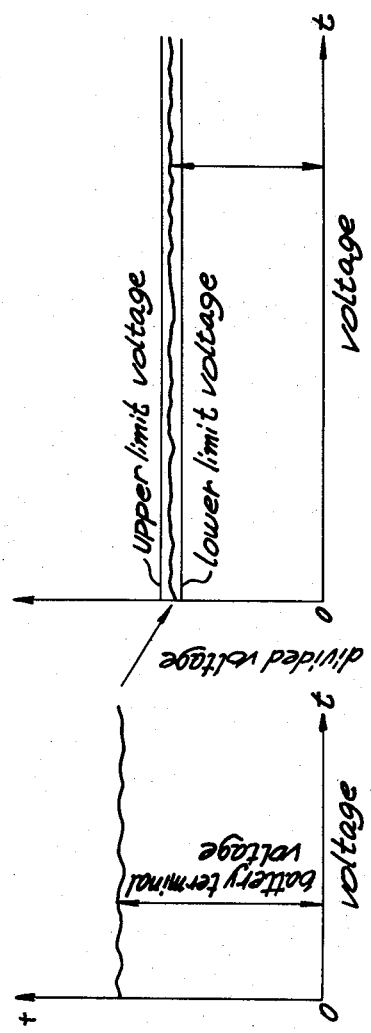
FIG. 4 is a graph showing a control operation.

In operation, the battery 9 is charged by the generator 2 operated by the engine 1. The voltage between the terminals of the battery 9 is inputted to the constant-voltage circuit 11 and to the voltage dividers 12 and 13. The constant-voltage circuit 11 supplies a constant voltage to the upper and lower limit setting circuits 14 and 15. The upper limit setting circuit 14 applies an upper limit voltage to the comparator 16 and the lower limit setting circuit 15 applies a lower limit voltage to the comparator 17. Each of voltage dividers 12 and 13 supplies voltage to the respective comparator in proportion to the voltage between the terminals of the battery 9. FIG. 4 shows the output voltages of the voltage dividers 12 and 13 and the upper and lower limit setting circuits 14 and 15.

The comparator 16 compares the output of the voltage divider 12 with the upper limit voltage from the circuit 14. When the output of the voltage divider 12 is higher than the upper limit voltage, the comparator 16 produces a signal to the throttle valve closing circuit 18, so that the circuit 18 generates a throttle valve closing signal. The signal is fed to the actuator 8 from output OUT (FIG. 5) of the driving circuit 20. On the other hand, when the output voltage of the voltage divider 13 is lower than the lower limit voltage from the lower limit setting circuit 15, the comparator 17 produces a signal which is fed to the throttle valve opening circuit 19. The circuit 19 produces a throttle valve opening signal which is also fed to the actuator 8 from output OUT of the driving circuit 20.

The motor 39 operates by the throttle valve closing signal or the throttle valve opening signal, so that the shaft 40 rotates in one direction or in the opposite direction according to the signal. The rotation of the shaft 40 is transmitted to the rod 27 through the gears 38, 37, 35 and 34. Although the gear 34 moves rotatably as well as in the axial direction by means of the screw thread portion 28 and the nut 30, since the gear 34 has peripheral axially-parallel teeth which are sufficiently wide (in the axial direction), the gear 34 always engages the gear 35. The rod 27 moves in the axial direction because of the engagement of the screw thread portion 28 with the nut 30. The rod 27 projects by the throttle valve opening signal and retracts by the closing signal. Projection of the rod 27 causes the shaft 21 of the throttle valve to rotate in the throttle valve open direction. Thus, the engine speed increases. To the contrary, when the rod is retracted, the throttle valve 6 is closed by the spring 26, so that the engine speed decreases.

When the plate 31 of the rod 27 actuates the limit switch 32 or 33 at the limit stroke end, which means the limitation of the operation of the throttle valve, the switch 32 or 33 produces a stop signal. The stop signal is fed to the driving circuit 20 via line 8a, so that the driving circuit 20 stops generating the driving signal. Thus, the operation of the throttle valve stops.

The increase in the engine speed increases the voltage between the terminals of the battery, so that the output of the voltage divider 13 rises. When the output of the voltage divider 13 reaches the lower limit voltage of the lower limit setting circuit 15, the comparator 17 stops producing the corresponding output. Thus, the throttle valve opening operation is stopped. Similarly the throttle valve closing operation stops, when the output of the voltage divider is equal to the upper limit voltage of the upper limit setting circuit 14.

Figure 5:
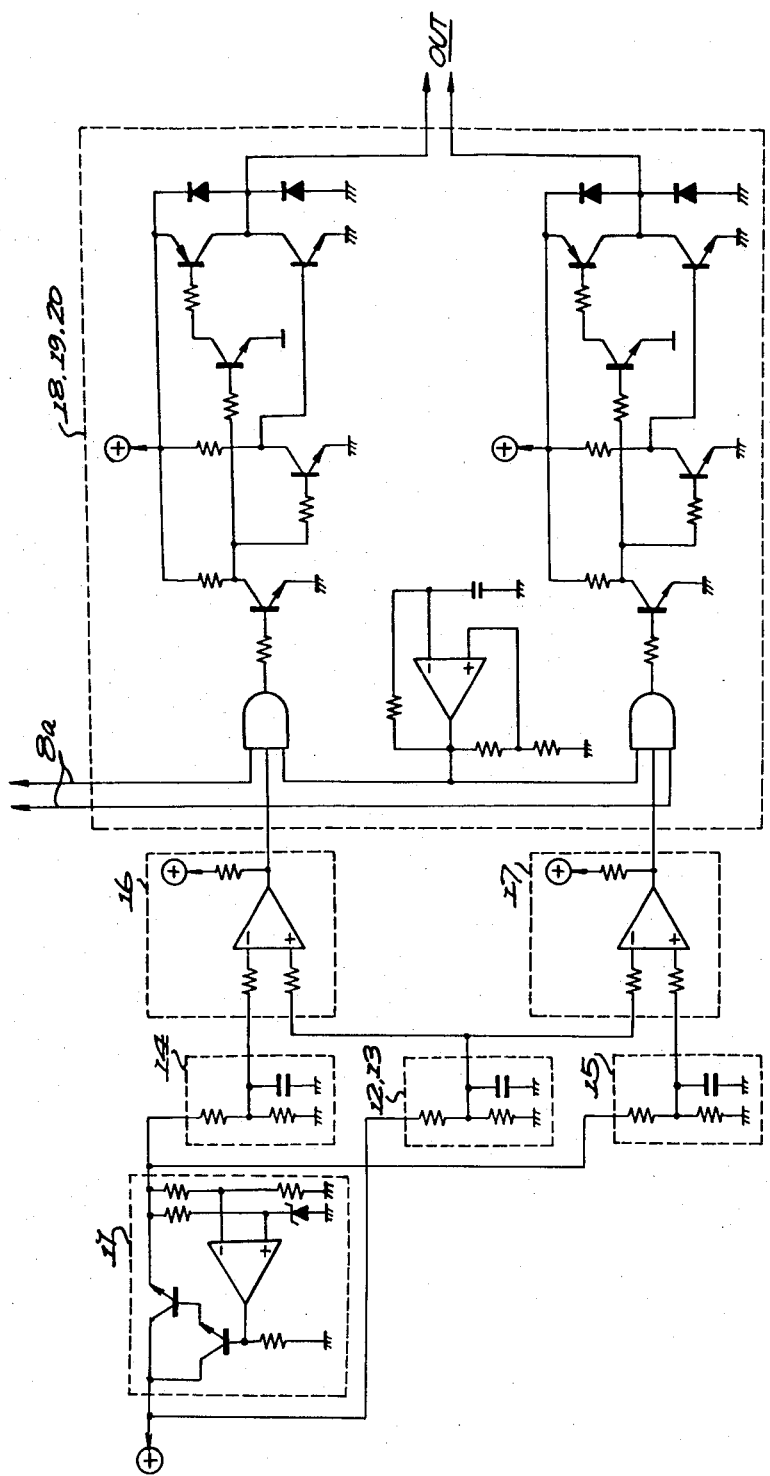
FIG. 5 shows an example of the control circuit.

Thus, in accordance with the present invention, the voltage between the terminals of the battery can be controlled to a predetermined level in spite of a variation of the electrical load. The system of the present invention is simple and hence economical. FIG. 5 shows an example of the electronic control circuit, in which the same parts as the circuit of FIG. 1 are identified by the same reference numeral.

When the accelerator pedal is depressed for accelerating the engine, the accelerator cable 24 is pulled to rotate the throttle lever 22 in the clockwise direction in FIG. 2. Thus, the lever 23 is detached from the rod 27 and the operation of the actuator 8 does not affect the throttle valve 6.

What is claimed is:

1. In a system for regulating the engine speed of a type having a battery with terminals, a generator connected to the engine and for charging said battery and a throttle valve provided in a carburetor of the engine, the improvement comprising
an actuator means for actuating said throttle valve,
means comprising a regulating circuit for controlling the idling speed of the engine via said actuator means so as to maintain the voltage between the terminals of said battery substantially at a predetermined constant valve comprising,
a constant-voltage circuit means having an input being applied with voltage from a terminal of said battery, said constant-voltage circuit means at an output thereof for producing a set constant voltage,
comparing circuit means for operatively comparing the voltage at said terminal of said battery with said set constant voltage and for producing an output signal in dependency on the difference between said voltages, and
a driving circuit means for sending a driving signal to said actuator means in dependency on said output signal of said comparing circuit means, and
said actuator means being responsive to said driving signal of said driving circuit means for opening and closing said throttle valve, respectively, in dependency on said output signal of said comparing circuit means for regulating the idling engine speed so as to maintain the voltage between the terminals of said battery at said predetermined constant value.

2. The system for regulating the engine speed according to claim 1 further comprising
means comprising an upper limit setting circuit connected to the output of said constant-voltage circuit means for producing an upper set constant voltage,
means comprising a lower limit setting circuit connected to the output of said constant-voltage circuit means for producing a lower set constant voltage, and
said comparing circuit means comprising a pair of comparators respectively connected to said upper and lower limit setting circuits, said output signal of said comparing circuit means comprises output signals, respectively, of said comparators operatively in dependency on the difference between said voltage at said terminal of said battery and said upper and lower set constant voltages respectively.

3. The system for regulating the engine speed according to claim 1 further comprising
means comprising a pair of limit switches provided in said actuator means for producing stop signals at predetermined stroke positions of said throttle valve for stopping the generation of the driving signal of said driving circuit means, said stroke positions of said throttle valve defining therebetween the idling condition of the engine and therebeyond the non-idling condition of the engine.

4. The system as set forth in claim 2, further comprising
voltage dividers connected between said comparators and said terminal of said battery.

5. The system as set forth in claim 2 or 4, further comprising
a closing circuit means and an opening circut means for closing and opening, respectively, said throttle valve via said output signals, respectively, and via said driving circuit means and connected between the latter and said comparators, respectively.

6. The system as set forth in claim 1, wherein
said constant-voltage circuit means includes an operational amplifier having one input connected to a voltage divider connected between said output of said constant-voltage circuit means and ground and another input connected between a grounded zener diode and said output of said constant-voltage circuit means, an output of said operational amplifier being connected to the input of said constant-voltage circuit means via a grounded base of a first transistor having a collector connected to said input and an emitter connected to a base of a second transistor, the latter having a collector connected to said input and an emitter connected to said output of said constant-voltage circuit means.

7. The system as set forth in claim 5, wherein said closing circuit means and said opening circuit means each comprises an AND gate having one input connected to said comparing circuit means and another input connected to means for stopping the generation of the driving signal of said driving circuit means, and a third input connected to the output of an operational amplifier with a positive input-output feedback and a negative input-output feedback, and a grounded capacitor being connected to the negative input of the operational amplifier.

8. The system as set forth in claim 1, further comprising
means for terminating an operative connection between said throttle valve and said actuator means or between said regulating circuit and said actuator means when said engine is out of the idling condition.

9. The system as set forth in claim 1, wherein said regulating circuit is an idling condition means for regulating the idling engine speed so as to maintain the voltage between the terminals of said battery at said predetermined constant value only in the idling condition.

10. The system as set forth in claim 4, wherein each said voltage divider includes a capacitor connected across a resistor of the voltage divider.

11. The system as set forth in claim 2, wherein said limit setting circuits each comprises a voltage divider including a capacitor connected across a resistor of the voltage divider.

12. The system as set forth in claim 3, further comprising
a closing circuit means and an opening circuit means for closing and opening, respectively, said throttle valve via said driving circuit means and connected between the latter and said comparing circuit means, respectively.

13. The system as set forth in claim 2, wherein said predetermined constant value is dependent on a value between said upper and lower set constant voltages.

* * * * *